(12) United States Patent
Eggers et al.

(10) Patent No.: US 7,130,486 B2
(45) Date of Patent: Oct. 31, 2006

(54) AUTOMOBILE INFRARED NIGHT VISION DEVICE AND AUTOMOBILE DISPLAY

(75) Inventors: Helmuth Eggers, Ulm (DE); Gerhard Kurz, Wendlingen (DE); Juergen Seekircher, Ostfildern (DE); Thomas Wohlgemuth, Aichtal (DE)

(73) Assignee: DaimlerChrysler AG, Stuttgart (DE)

( * ) Notice: Subject to any disclaimer, the term of this patent is extended or adjusted under 35 U.S.C. 154(b) by 814 days.

(21) Appl. No.: 10/352,510

(22) Filed: Jan. 28, 2003

(65) Prior Publication Data
US 2003/0142850 A1 Jul. 31, 2003

(30) Foreign Application Priority Data
Jan. 28, 2002 (DE) .................... 102 03 421

(51) Int. Cl.
*G06K 9/60* (2006.01)
*G06K 9/34* (2006.01)

(52) U.S. Cl. ........................... 382/274; 701/45
(58) Field of Classification Search ................ 382/274, 382/264, 266, 279, 293, 299; 701/45, 28
See application file for complete search history.

(56) References Cited

U.S. PATENT DOCUMENTS

| 5,555,324 A | 9/1996 | Waxman | |
|---|---|---|---|
| 6,324,453 B1 * | 11/2001 | Breed et al. | 701/45 |
| 6,442,465 B1 * | 8/2002 | Breed et al. | 701/45 |
| 6,507,779 B1 * | 1/2003 | Breed et al. | 701/45 |
| 6,772,057 B1 * | 8/2004 | Breed et al. | 701/45 |
| 6,820,897 B1 * | 11/2004 | Breed et al. | 280/735 |
| 6,856,873 B1 * | 2/2005 | Breed et al. | 701/45 |

FOREIGN PATENT DOCUMENTS

| DE | 199 50 681 A1 | 4/2001 |
|---|---|---|
| DE | 100 17 185 A1 | 10/2001 |
| FR | 2 726 144 A1 | 4/1996 |

* cited by examiner

*Primary Examiner*—Sanjiv Shah
(74) *Attorney, Agent, or Firm*—Akerman Senterfitt; Stephan A. Pendorf

(57) ABSTRACT

The invention concerns an automobile display unit, an automobile infrared night vision device and an automobile with such a display unit or, as the case may be, with such an infrared night vision device. The display includes an image processing unit which processes the image data supplied to it such that contiguous areas of maximal light intensity are recognized and these image data are adapted to the extent that they are at least partially replaced by image data with reduced light intensity values. These changed image data are supplied to the display, which reproduces these image data. This display unit makes possible a reduction or a prevention of blinding by brilliant light, which is particularly disturbing in a case of display of infrared night vision image information.

9 Claims, 3 Drawing Sheets

AUTOMOBILE INFRARED NIGHT VISION DEVICE AND AUTOMOBILE DISPLAY

BACKGROUND OF THE INVENTION

1. Field of the Invention

The invention concerns an automobile display, an automobile infrared night vision device and a vehicle equipped with such a device.

2. Description of the Related Art

Automobile night vision devices are known from DE 39 32 216 C2 and DE 40 07 646 A1.

These include a camera having sensitivity outside the visible frequency range of light, for example, at a wavelength of between 800 nm and 2000 nm. Beyond this, they include light sources which emit polarized or, as the case may be, non-polarized infrared light, for illumination of the environment. The infrared light reflected from the environment is received by the infrared camera and is imaged upon a display device provided in the field of view of the vehicle operator, which may be in the form of a heads-up display. The image data received by the camera is relayed to the display device/display.

Night vision devices of this type for automobile applications have already been disclosed with various designs. On the basis of adverse effects in the camera ("blooming", "streaking") or due to scatter light effects, so called "tangential" or "acute" lights can result. These acute lights can be substantially larger in their geometric form than the actual image of the light source.

As a result of the high maximal light density in automobile display devices, a not insignificant blinding effect can occur in the observer as a result of the acute lights, even in the case of attenuated total illumination of the display in the automobile.

From DE 10017185 A1 a device and a process for recording and displaying images is known which provide a mobile observation system for scenes with an extremely high light intensity dynamic, without causing a blinding of the observer. Herein a process for image processing is employed, in order to subdivide recorded images into contiguous areas and, within the individual areas, to individually adapt the respective light intensity contrast to the light intensity dynamics of the display means. The distribution or division of the image into areas with various light intensities occurs preferably with the aid of processes and algorithms for image processing, such as the application of threshold values and area-oriented segmentation processes. A dimming of the field of view occurs particularly in the case of the occurrence of extreme light brightness. Published patent document DE 19950681 A1 discloses an image recognition system, in particular for automobiles, which makes it possible to completely or partially darken those individual parts of images to be displayed upon the image screen which exhibit too great of a light intensity. These image areas can either be completely dimmed with loss of the entire image information content, or alternatively the image areas may also be displayed with reduced intensity.

SUMMARY OF THE INVENTION

The invention is based upon the task, of providing an automobile display or, as the case may be, infrared night vision device, which is better or, as the case may be, easier to read for the driver or vehicle occupants or, as the case may be, of which the information is more easily comprehended or assimilated and therewith is more useful, or, as the case may be, to provide a vehicle which is equipped with such an automobile display or, as the case may be, infrared night vision device.

This task is inventively solved by an automobile display with the characteristics of claim 1 or, as the case may be, an automobile infrared night vision device with the characteristics of claim 12 and a vehicle with the characteristics of claim 13.

Advantageous embodiments of the invention can be found in the dependent claims.

The invention is based upon the idea, that the automobile display unit, which is suited for example for display of image data of a night vision device, is provided with an image processing device, which recognizes bright lights and replaces their image points with image points which are at least partially reduced in their intensity.

For this, the image data to be processed and reproduced are fed to the display unit, for example from a camera or from an image producing radar sensor or another appropriate image source associated with the display unit. The image data is processed in an image processing device, namely the contiguous areas of image data are determined, of which the image points exhibit a light intensity above a predetermined light intensity threshold. The thus determined image points are therein subjected to a correlation analysis. A large number of processes are known for correlation analysis. For example it has been found to be advantageous to employ a so-called meter or count process, in which it is checked, whether other image points which exhibit a correspondingly high light intensity exist in the environment of an image point. If a sufficient number of qualified adjacent image points are located, then this point is recognized as part of a contiguous area and appropriately marked. Besides this, other equally suited correlation analysis processes are also known, such as the CCC-process.

By correlation analysis areas in the input image data are determined which represent the acute lights. The image data of these adjacent or coherent areas are modified to the extent that they are assigned at least partially changed light intensity values which represent a reduced light intensity. Thereby specifically those areas of the image to be reproduced which could lead to an impairment of the user of the automobile display unit are selectively darkened.

The darkening of the contiguous areas occurs at least partially. It need not occur completely, although a complete darkening is very useful.

The image data could be black-white image data as well as color image data or similar image data, which have in common that they exhibit information by exhibiting intensity, for example a gray value or a similar value. Each image point is represented by image data, which includes a light intensity value and beyond this also further essential information, for example, color value and appropriate red-green-blue primary color data (R-G-B-data).

It has been found to be particularly advantageous to darken the image points to be darkened to the extent that their light intensity value is reduced by a constant, predetermined light intensity value, which results in a very simple operation with very low computer processing requirement. Beyond this it has been found to be desirable to reduce the light intensity values of the image points to be darkened by a predetermined factor, that is, to reduce the original light intensity values relatively, that is, to darken by a predetermined percentile or predetermined factor. A likewise simple and effective method for darkening is provided thereby, that the area to be darkened is replaced by image data which displays a predetermined light intensity value in place of a preset constant or preset relative reduction of the light intensity. Besides these particularly preferred modes of the attenuation, various other modes of attenuation of light intensity by reduction of the light intensity values are possible and entirely advantageous.

It has been found to be particularly advantageous to use a stored data table, from which predetermined light intensity values can be read, to which the light intensity values are to be reduced or about which the presented or incoming light intensity values are to be reduced or the predetermined factors. This stored or memory table makes possible a differentiated reduction of the light intensity, for example depending upon the size of the areas which represent an acute light. The size of the area of an acute light is produced herein by the number of the image points of the coherent or contiguous area. Therein it has been found to be particularly advantageous to reduce areas of greater size more strongly than less expansive areas.

It has been found to be particularly advantageous to use a device for determining a central area and an edge area for dividing the coherent area into a central and an edge area and to treat these differentially and thereby to achieve a comfortable to view light intensity reduction, which prevents the disturbing blinding effect on the user. By this differentiation a very comfortable and simple recordation of the image information for the user is accomplished. Therein it has been found to be particularly advantageous, to leave the edge area of the coherent area unchanged in its light intensity and to significantly reduce the central area according to a predetermined manner. Thereby there results a representation of an acute light in the manner of a corona representation, as would result during a solar eclipse. This representation has been found to be very comfortable for the user. Beyond this it is advantageous to at least partially reduce both the central area as well as the edge area in its light intensity, whereby the central area is more strongly reduced than the edge area. This is particularly simple to achieve by reduction using predetermined light intensity factors, in that the factor for the relative reduction of the light intensity of the central area is selected to be greater than that of the edge area. A particularly advantageous manner of light intensity reduction is achieved thereby, that the edge area shows a smooth transition from the non-light intensity reduced area outside of the coherent area progressing towards the central area. Thereby there results an even more pleasant representation of the image data to be reproduced again.

It has been found advantageous, to so design the image processing unit, that it is suited, not to subject to a reduction in intensity coherent areas of a very small size, for example of less than 20 pixels, while larger coherent areas, which represent an acute light, to subject targetedly to a light intensity reduction.

Preferably a compression step or stage is associated with the image processing unit, which is used for reduction of the light intensity dynamics of the supplied image data. For this, the light intensity values of the supplied image data are compromised to a predetermined light intensity interval or range, which is determined by a maximal light intensity value and a minimal light intensity value. By this processing of the image data in connection with the adaptation of the light intensity value in associated areas it becomes possible to represent the image data upon the display of the display unit in a manner which is very comfortable for the user as well as particularly simple to comprehend.

Therein it has been found to be particularly advantageous, to select the upper limit value of the compression interval $H_{max}$ to be equal to the light intensity value, so that one and the same light intensity value is selected for the compression as well as for the determination of the coherent area which results in a particularly efficient cooperation between the compression stage and the image processing unit with the device for reduction of the light intensity value in contiguous image areas.

It has been found to be particularly advantageous to provide an automobile night vision device with an automobile display unit with the above mentioned image processing unit and in particular with an associated compression stage, as above described, since particularly with this automobile night vision device image data are input with a very high light intensity dynamic range, which precisely by the use of displays with high luminosity and therewith high lightness and contrast values have the consequence of blinding the user absent the appropriate inventive precautions. On the basis of the inventive design of the automobile display unit as such or, as the case may be, as part of the automobile night vision device, which is preferably provided with an IR-camera with a logarithmic light recognition curve, an undesired blinding of the user is at least reduced and in certain cases completely prevented.

A further design according to the invention provides a vehicle with an automobile display unit or, as the case may be, with an automobile night vision device, as previously described. One such equipped automobile makes it possible for the user to simply and accurately comprehend his environment or, as the case may be, for additional relevant data such as temperature, vehicle speed and the like to be made available for his vehicle driving decisions.

BRIEF DESCRIPTION OF THE DRAWINGS

In the following the invention will be described in greater detail using, as an example, an automobile night vision device.

DETAILED DESCRIPTION OF THE INVENTION

The invention shown in the figures concerns a night vision device for automobile application.

Figure 2:
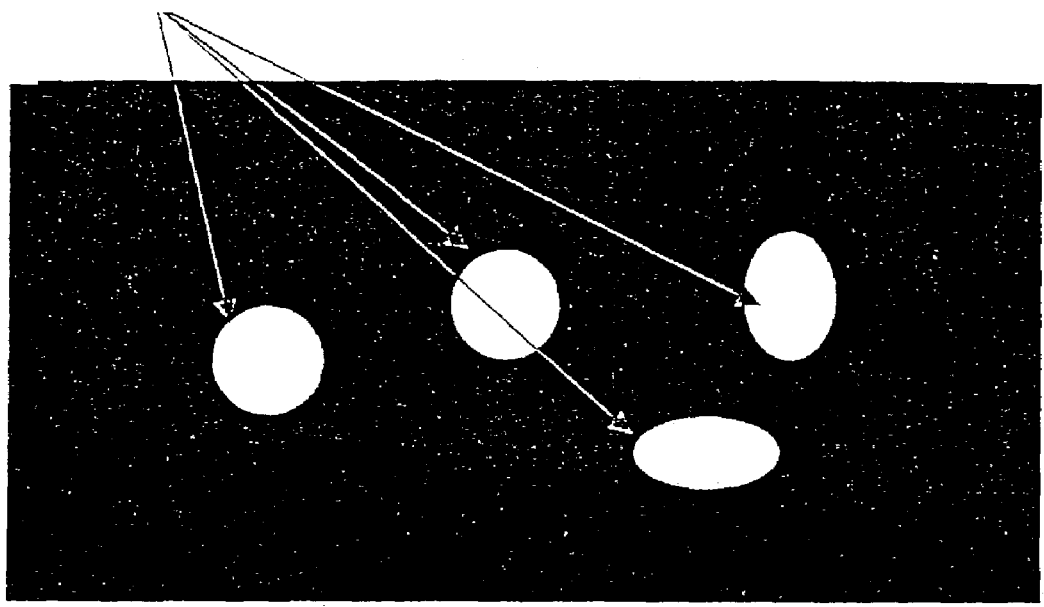
FIG. 2 shows an exemplary night scene with brilliant light.

As a result of negative effects in the camera ("blooming", "streaking") or as a result of scatter light effects, so-called "acute lights" can result, wherein these in their geometric design or form can appear substantially larger than the actual image of the light source. An exemplary image of these acute lights is shown in FIG. 2.

Figure 1:
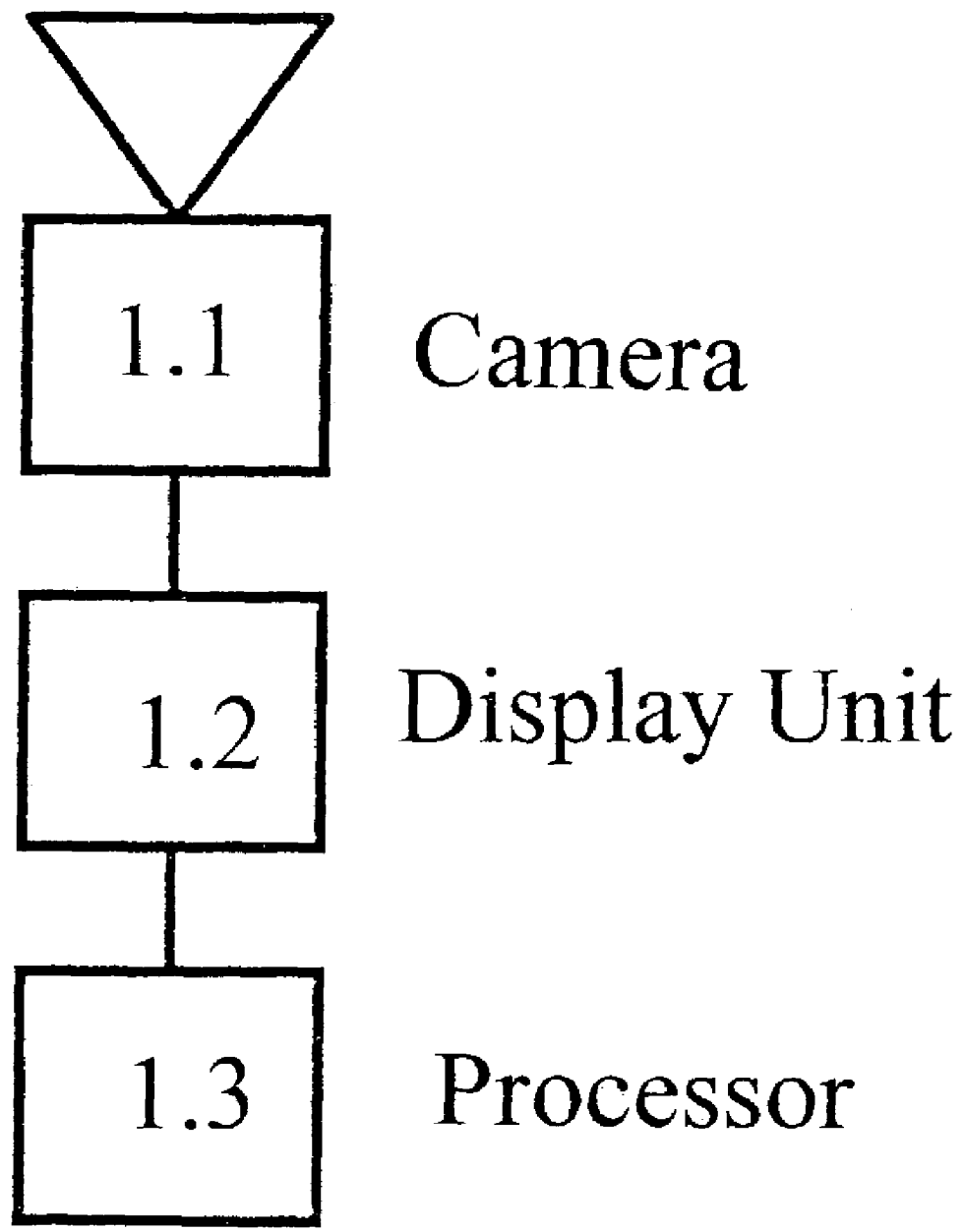
FIG. 1 shows the construction of an automobile night vision device.

The invention makes it possible to present the user (operator of an automobile) with an image rich in detail, brilliant and free of blinding. The inventive automobile night vision device is designed as represented in FIG. 1.

On the basis of the high maximal light density for automobile display units, even in the case of attenuated overall light intensity of the display, highlights or brilliant lights can emit a not in substantial blinding effect upon the user. According to the invention a process and a device is proposed, which recognizes acute lights and makes possible any desired light intensity reduction change of its gray value, which can be designed differentially respectively independent of the respective design or application of the night vision device.

It records the environment outside of the vehicle with the aid of a highly sensitive and high dynamic electronic camera (1, 1). For enhancement of the dynamic range the individual image points of the camera can be electronically designed as receiver with light dependent variable recognition curves. Typically these are piecewise linear or logarithmic recognition lines. The camera converts the recorded image according to its recognition lines into a field of gray values ("digital image"). On the basis of the required high dynamic of the camera at least 8, more conventionally however 10 or 12 bit are employed for representation of the contrast range.

In an image processing unit (1.2) the images are so processed, that they are suitable for representation on a display (1.3). This processing can include multiple steps, could however simply be comprised according to the state of the art by a simple "ray tracing" or "pass through" of the images.

The display unit converts the processed image into visible light and brings it to the recognition of the user. The display can be a CRT-image screen, an LCD or TFT display, a projection module (heads up display) or may be another type. All variations typically have in common that for technical reasons they can only represent a contrast range of 6, maximal 8, bit. At the same time, for reasons of recognition or comprehension certainty for other displays, substantial light intensities in the area of maximal lightness is required.

Particularly in night traffic scenes there results from the dark, unilluminated environment and the presence of active light sources (for example headlights of other vehicles) an extremely high scene contrast, which can easily exceed 80 dB (1:10000). A sensitivity of the sensors is required in order to be able to represent passive (non-illuminated) objects in the environment not illuminated by foreign light sources with sufficient contrast. The high dynamic range results from the possible presence of active light sources. For the supplemental lightening up of passive objects, it is possible that the vehicle with the night vision system is itself equipped with a light source.

From this, there results the requirement that the image processing unit (1.2), particularly in the case of night scenes, must compress the image provided by the camera with 10 . . . 12 bit to a display-justified image of 6 (or 8) bit, wherein again various processes (non-linear recognition curves) can be employed.

Figure 3:
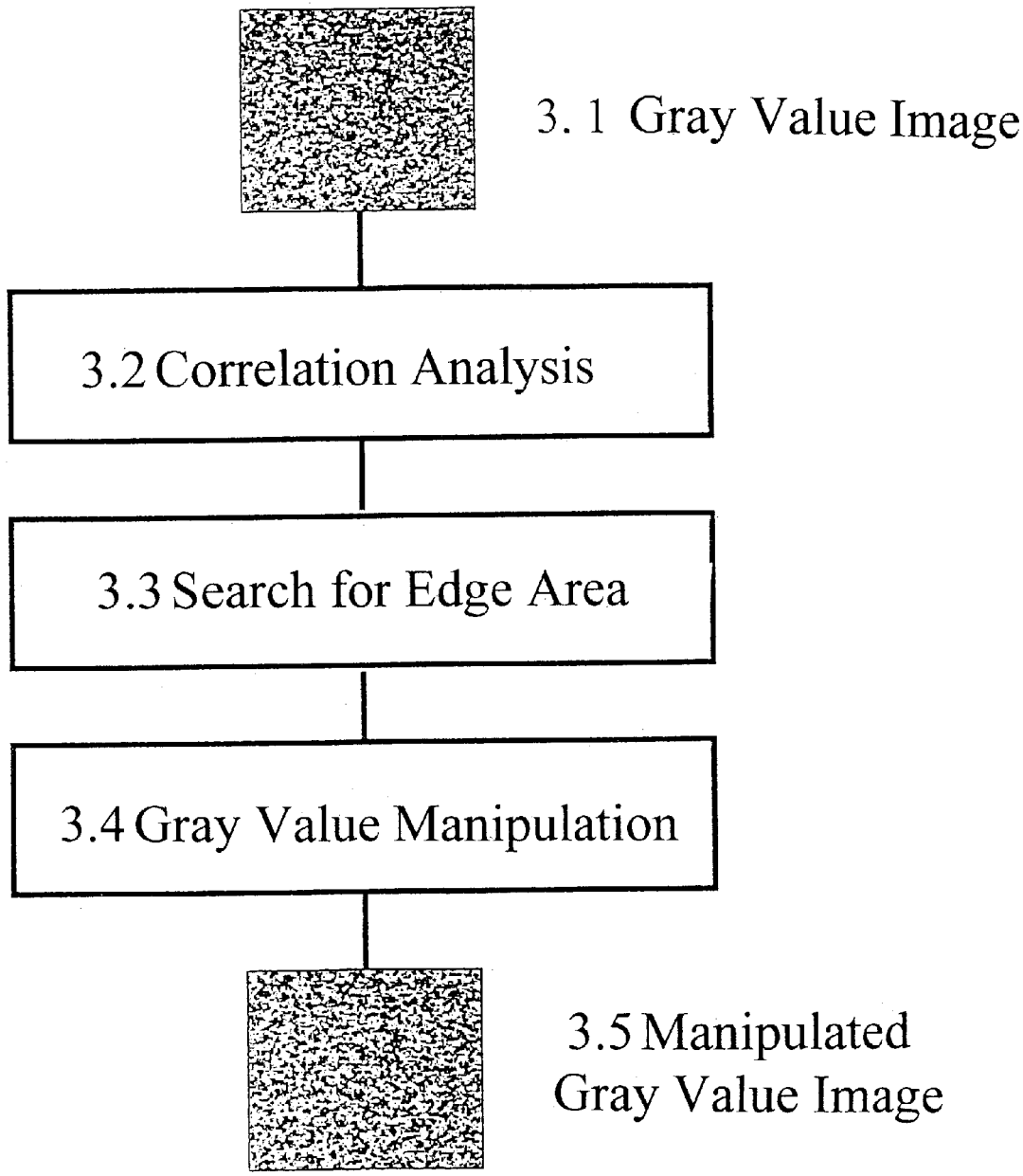
FIG. 3 shows a schematic representation of the manner of fun of the image-processing unit.

The core of the inventive process takes effect following the compression of the image data to the desired gray value range. It is comprised of the steps illustrated in FIG. 3. The gray value image (3.1) is scanned or examined for contiguous areas of maximal light intensity (correlation analysis; 3.2), wherein areas below a predetermined value can be ignored. An area of contiguous gray value is comprised of at least two image points of the same gray value step. In the found areas a central area and an edge area are determined (image area search; 3.3). Subsequently, the image points which lie in the central or edge areas are manipulated according to the requirements of the application or use (gray value manipulations; 3.4). The manipulation of the gray values can occur differently in the central and in the edge areas. The manipulated gray value image (3, 5) is then relayed to the display unit.

The manipulation can occur, for example, such that in the central area the gray value of the image point is reduced by a predetermined fixed value, whereby the blinding effect of this area is minimized. Alternatively, the gray value of the concerned image points can also be replaced by a fixed value, which is so selected that no blinding effect occurs. The manipulation can occur suddenly, without differentiating of central and edge area, or can be produced with a more gradual transition from the actual gray value to the manipulated gray values in the central area. The selection of a suitable value for manipulation of the gray value can itself again occur by a suitable process, or however by reading the value from a table which is indexed with a suitable quantification or numeric value (average value, gray value sum, number of pixels or a particular gray stage in a tabulation window).

Automobile night vision systems, such as those described here, are constructed with high sensitivity and high dynamic (usually logarithmic) image sensors/cameras. Therein as a rule the gray value range processed by the sensor exceeds the capacity or capability of the display by a multiple-fold. It is thus necessary to select for display a partial area or range of the sensor gray value area or range, wherein gray values falling below or exceeding the area or range are replaced by a minimal or as the case may be maximal value (compression). There results, particularly in the area of the maximal value, closed islands of maximal light intensity, from which a blinding effect for the operator can be presumed. The gray value in contiguous areas of maximal light intensity must again be reduced (the light intensity is proportional to the gray value). For this, depending upon the shape parameters of the area (for example size and/or circumference) a new gray value with changed light intensity value is determined and the concerned area is entirely or partially filled with this gray value. The determination of this gray value occurs in accordance with the requirements of the respective application. The blinding effect of contiguous areas of maximal light intensity in the display is thereby reduced or completely eliminated.

The invention claimed is:

1. An automobile display unit for representation of image data of a night vision device comprising:
 an image processing unit, to which image data is supplied, and which is adapted for processing the image data supplied to at such that,
  contiguous areas of image data are determined, of which the image points exhibit a greater lightness than a predetermined lightness threshold value,
  the image data of the image points of these contiguous areas are replaced by image data, which exhibit at least a partially reduced light intensity value:
 a display for representation of the image data supplied by the image processing unit; and
 a control unit for controlling the display unit,
 wherein the image processing unit includes a unit for determining a central area and an edge area of the contiguous areas and is adapted for assigning the image points of the central area image data with reduced lightness, in comparison to which the image points of the edge area of the image data are assigned light intensity values which are different therefrom.

2. An automobile display unit according to claim 1, wherein the image processing unit is adapted to assign the image points of the central area of the image data with reduced lightness, in comparison to which the image points of the edge area of the image data are assigned unchanged light intensity valves.

3. An automobile display unit according to claim 1, wherein the image processing unit is adapted to assign the image points of the central area image data with reduced light intensity, in comparison to which the image points of the edge area of the image data are assigned lesser reduced light intensity values compared to the central area.

4. An automobile display unit according to claim 3, wherein the image processing unit is adapted to assign to the image points of the central area image data with reduced light intensity, in comparison to which the image points of the edge area are assigned image data, which approach the light intensity values of the central area as their proximity to the central area increases.

5. An automobile display unit according to claim 1, wherein the image processing unit is provided upstream with a compression stage for reduction of the light intensity range, which is adapted to compress the light intensity values to a light intensity interval between $H_{max}$ and $H_{min}$.

6. An automobile display unit according to claim 5, wherein the $H_{max}$ value is selected as the predetermined light intensity threshold value for determining the contiguous areas.

7. An automobile night vision device comprising:
    (a) a camera which has a logarithmic light recognition curve;
    (b) an image processing unit for processing image data supplied to it by said camera, and which is adapted for processing the image data supplied to it such that
        contiguous areas of image data are determined, of which the image points exhibit a greater lightness than a predetermined lightness threshold value,
        the image data of the image points of these contiguous areas are replaced by image data, which exhibit at least a partially reduced light intensity value;
    (c) a display for representation of the image data supplied by the image processing unit; and
    (d) a control unit for controlling the display unit, wherein the image processing unit includes a unit for determining a central area and an edge area of the contiguous areas and is adapted for assigning the image points of the central area image data with reduced lightness, in comparison to which the image points of the edge area of the image data are assigned light intensity values which are different therefrom.

8. An automobile night vision device according to claim 7, wherein said camera is an IR-camera.

9. A vehicle equipped with an automobile night vision device comprising:
    (a) a camera which has a logarithmic light recognition curve;
    (b) an image processing unit for processing image data supplied to it by said camera, and which is adapted for processing the image data supplied to it such that
        contiguous areas of image data are determined, of which the image points exhibit a greater lightness than a predetermined lightness threshold value,
        the image data of the image points of these contiguous areas are replaced by image data, which exhibit at least a partially reduced light intensity value;
    (c) a display for representation of the image data supplied by the image processing unit; and
    (d) a control unit for controlling the display unit, wherein the image processing unit includes a unit for determining a central area and an edge area of the contiguous areas and is adapted for assigning the image points of the central area image data with reduced lightness, in comparison to which the image points of the edge area of the image data are assigned light intensity values which are different therefrom.

* * * * *